US005646821A

United States Patent [19]

Sun

[11] Patent Number: 5,646,821
[45] Date of Patent: Jul. 8, 1997

[54] PORTABLE COMPUTER WITH TRACKBALL KEYS MOUNTED ON AN EDGE OF A COMPUTER HOUSING

[75] Inventor: Chen-Ming Sun, Taipei, Taiwan

[73] Assignee: Mitac International Corp., Hsinchu, Taiwan

[21] Appl. No.: 707,504

[22] Filed: Sep. 4, 1996

[51] Int. Cl.[6] ............................... H05K 5/02; G06F 1/16
[52] U.S. Cl. ........................ 361/683; 200/330; 345/167
[58] Field of Search ................................. 361/680, 683;
364/708.1; 200/329, 330, 341; 345/157,
161, 163, 167; G06F 1/16

[56] References Cited

U.S. PATENT DOCUMENTS 5,287,246  2/1994  Sen ........................................ 361/683
5,341,154  8/1994  Bird ...................................... 345/167
5,546,334  8/1996  Hsieh et al. ........................ 364/709.11
5,579,032  11/1996  Busch ................................. 345/157

*Primary Examiner*—Leo P. Picard
*Assistant Examiner*—Lynn D. Field
*Attorney, Agent, or Firm*—Klauber & Jackson

[57] ABSTRACT

A portable computer includes a computer housing which has a top wall and a front wall, a pointing device which is mounted on the top wall and adjacent to the front wall, a concavity which is formed adjacent to the pointing device and which is open at the top and front walls, and a press button which is mounted resiliently in the concavity. The press button has a top press plate which is exposed from the top wall, and a front press plate which extends forwardly and downwardly of the top press plate and which is exposed from the front wall. The press button is operated when pressure is exerted on either the top press plate or the front press plate.

5 Claims, 5 Drawing Sheets

PORTABLE COMPUTER WITH TRACKBALL KEYS MOUNTED ON AN EDGE OF A COMPUTER HOUSING

BACKGROUND OF THE INVENTION

1. Field of the Invention

This invention relates to a portable computer, more particularly to a portable computer which has trackball keys mounted on an edge of the computer housing such that the trackball keys can be conveniently operated.

2. Description of the Related Art

Referring to FIG. 1, a conventional portable computer is shown to comprise a computer display screen 14 and a computer housing 13. A keyboard 11 and a trackball 12 are mounted on the top wall 15 of the housing 13. The trackball 12 has a pointing device 16 and two press buttons 10 which include a pick-up key and a return key that are mounted on the top wall 15. In use, the user operates the pointing device 16 of the trackball 12 with one finger, and then operates the buttons 10 with the use of his thumb. The operation as such is inconvenient.

SUMMARY OF THE INVENTION

Therefore, the objective of the present invention is to provide a portable computer which has a trackball key mounted on an edge of the computer housing for added convenience during operation.

According to this invention, the portable computer includes a computer housing which has a top wall and a front wall, a pointing device which is mounted on the top wall and adjacent to the front wall, a concavity which is formed adjacent to the pointing device and which is open at the top and front walls, and a press button which is mounted resiliently in the concavity. The press button has a top press plate which is exposed from the top wall, and a front press plate which extends forwardly and downwardly of the top press plate and which is exposed from the front wall. The press button is operated when pressure is exerted on either the top press plate or the front press plate.

BRIEF DESCRIPTION OF THIS DRAWINGS

Other features and advantages of the present invention will become apparent in the following detailed description of a preferred embodiment of the invention, with reference to the accompanying drawings, in which.

DETAILED DESCRIPTION OF THE PREFERRED EMBODIMENT

Figure 1:
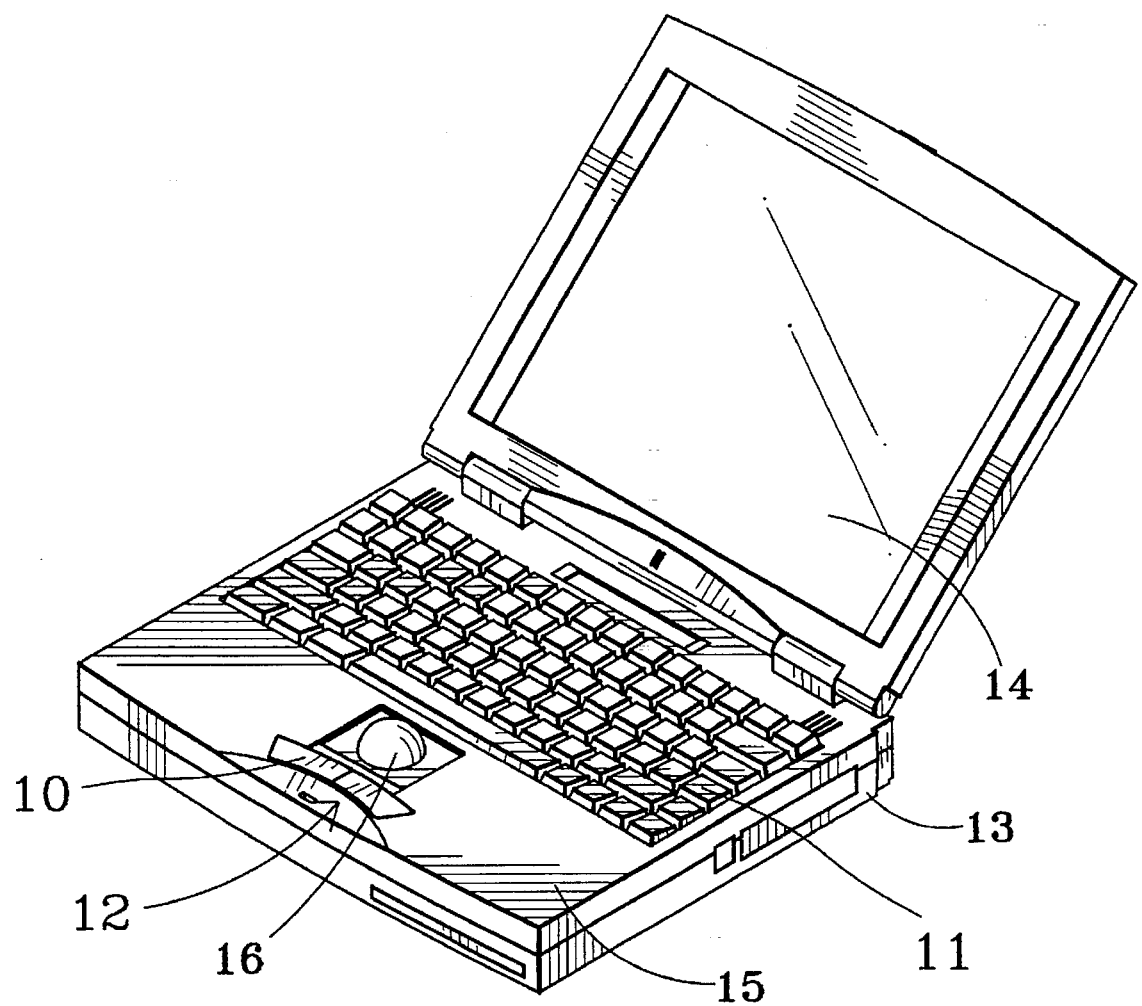
FIG. 1 is a perspective view of a conventional portable computer.
Figure 2:
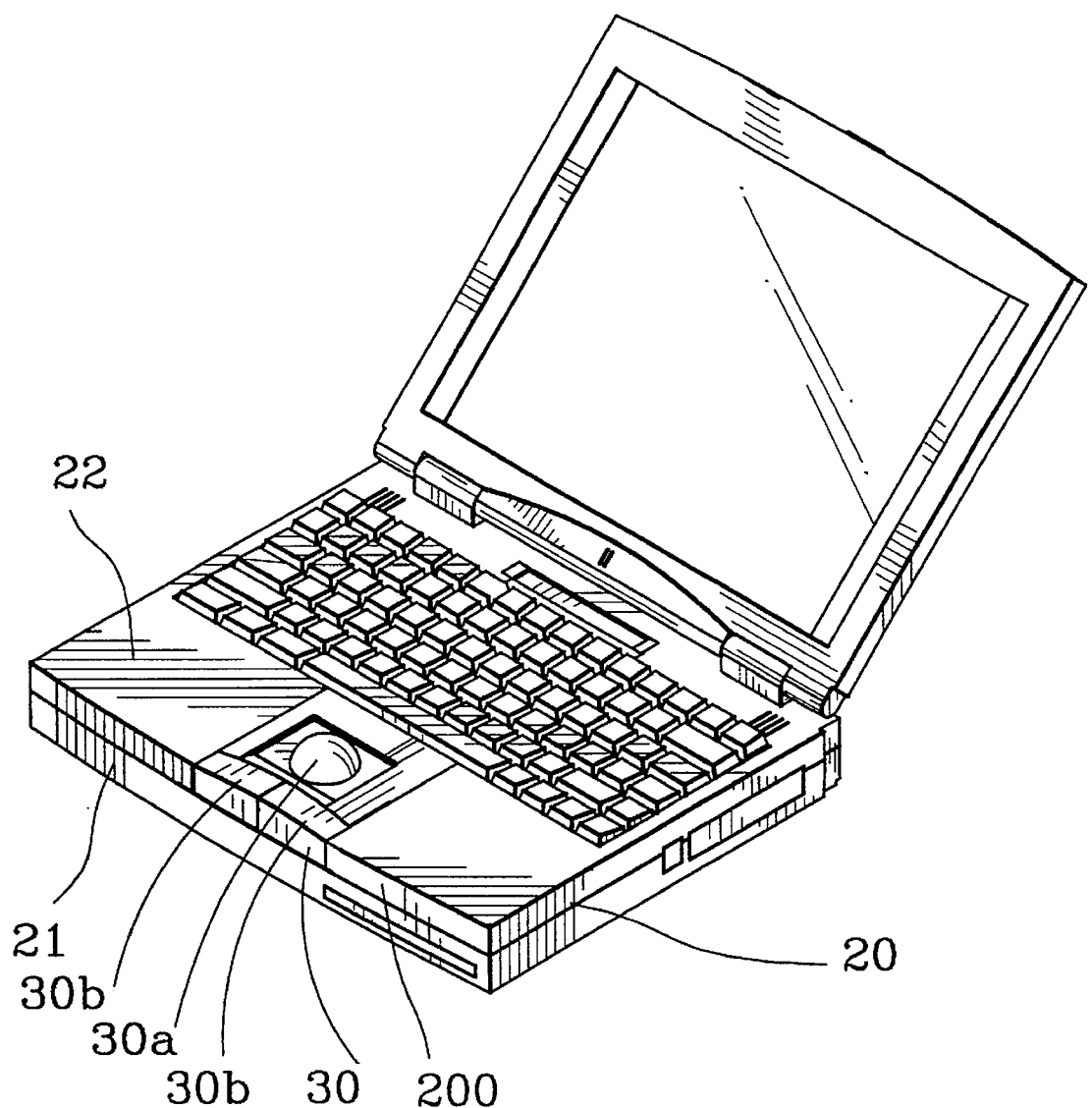
FIG. 2 is a perspective view of a preferred embodiment of a portable computer according to the present invention.
Figure 3:
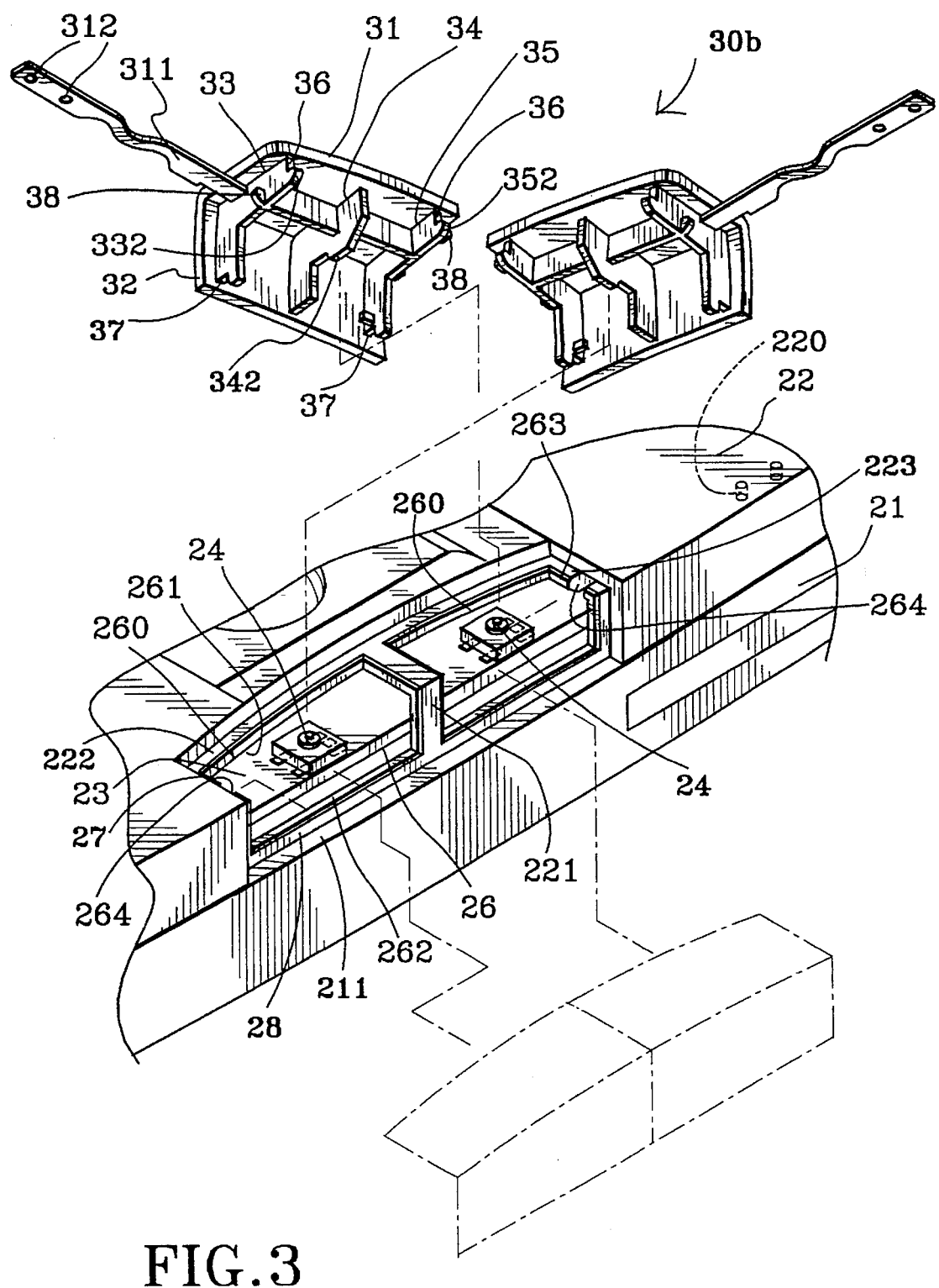
FIG. 3 is an exploded view showing trackball keys according to the present invention.

Referring to FIGS. 2, the preferred embodiment of a portable computer according to the present invention is shown to include a computer housing 20 which has a top wall 22 and a front wall 21 that define a housing edge 200, and a trackball 30 which includes a pointing device 30a and two press buttons 30b that include a pick-up key and a return key. The pointing device 30a is mounted on the top wall 22 adjacent to the front wall 21 and is operable so as to move a cursor on a computer display screen in a known manner. The press buttons 30b are provide resiliently on the top wall 22. A mainboard 23 (as shown in FIG. 3) is disposed below the top wall 22. Two trackball key electric contacts 24 are mounted on the mainboard 23.

Figure 6:
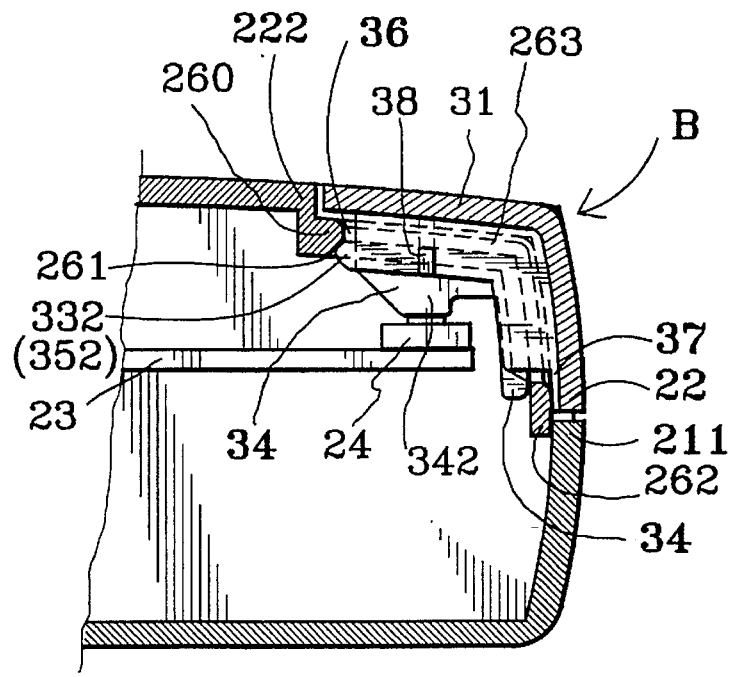
FIG. 6 is a sectional view of the preferred embodiment, taken along line VI—VI in FIG. 4.

Referring to FIGS. 2 and 3, the top wall 22 has a first cutout 27 which is formed adjacent to the housing edge 200, and the front wall 21 has a second cut-out 28 which is connected to the first cutout 27 at the housing edge 200. Two concavities 26 are open at both the top wall 22 and the front wall 21 via the cutouts 27, 28. The press buttons 30b are mounted in the concavities 26, respectively. With reference to FIG. 6, the top wall 22 has edges 222 and 223 that confine the first cutout 27, and a tongue 260 which extends downwardly from the edge 222 and which projects into the concavity 26. Tongues 263 extend downward from the edges 223 and project inwardly of the concavity 26. A cam face 261 is formed on an end of the tongue 260 which is beveled, and inclines downwardly and rearwardly. A notch 264 is formed in each tongue 263. The front wall 21 has an edge 211, and a tongue 262 which extends upwardly from the edge 211. A bridge 221 extends from the edge 222 to the edge 211 to partition the concavities 26.

Each press button 30b has a top press plate 31 which is exposed from the top wall 22, a front press plate 32 which is exposed from the front wall 21, and an elongated resilient plate 311 which extends outwardly from one side of the top press plate 31 and which has an end that is formed with positioning holes 312. Ribs 33, 34 and 35 extend along the inner surfaces of the top and front press plates 31, 32 and project downward from the top press plate 31 and rearward from the front press plate 32. Each rib 33 or 35 has a stepped rear rib end 36 which is formed with a cam follower face 332 or 352. The rib 34 has a press projection 342 which extends downward to contact the electric contact 24. As shown to FIG. 6, the rear terminating end of the top press plate 31 is seated on the shoulder formed by the edge 222 and the tongue 260, and the lower terminating end of the front press plate 32 is seated on the shoulder formed by the edge 211 and the tongue 262. The end of the tongue 260 extends below the rear terminating end of the top press plate 31 to engage the stepped rear rib end 36. Side projections 38 project respectively from the ribs 33, 35.

Figure 4:
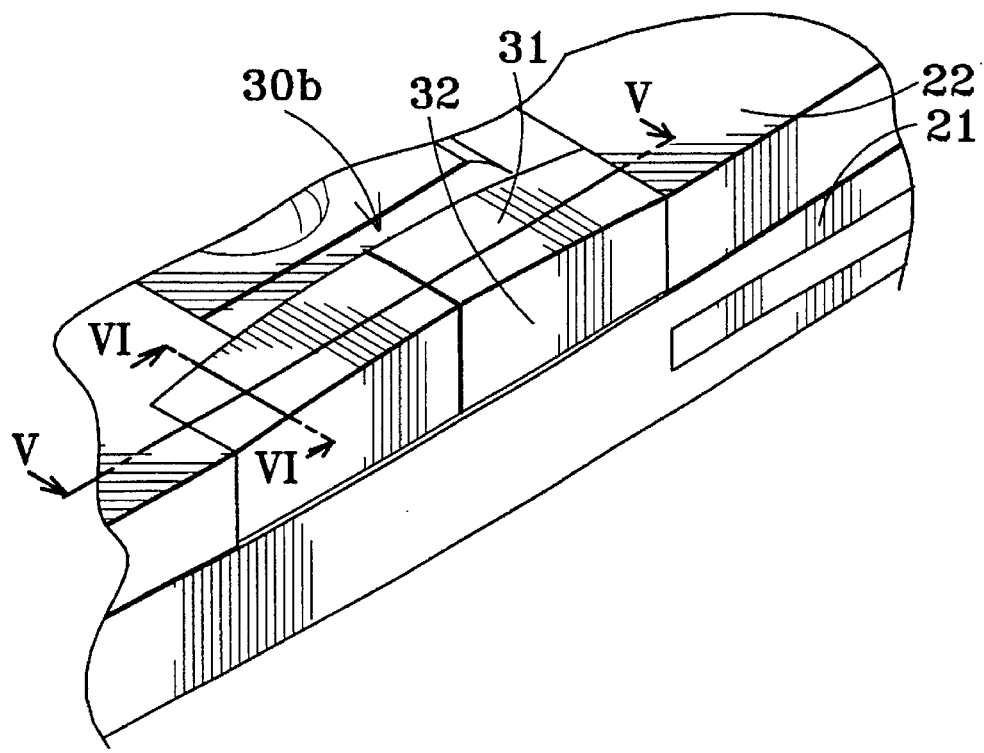
FIG. 4 is a perspective view showing the trackball keys of FIG. 3 after assembly.
Figure 5:
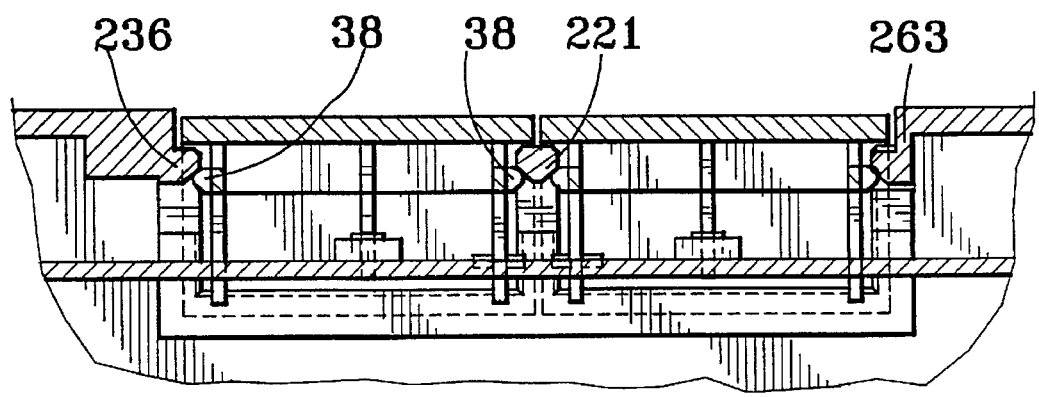
FIG. 5 is a sectional view of the preferred embodiment, taken along line V—V in FIG. 4.

In assembly, referring to FIGS. 3 and 4, each resilient plate 311 passes through the respective notch 264 and is mounted to the housing 20 by engaging the holes 312 with a plug 220 in the housing 20. As shown in FIG. 5, when each top press plate 31 is placed in the respective concavity 26 and is pressed downwardly, each side projection 38 slides downwardly along the surface of the tongue 263 and the bridge 221, and then moves past the tongue 263 and the bridge 221. Meanwhile, as shown in FIG. 6, each stepped rear rib end 36 slides downwardly along the surface of the tongue 260 and then moves past the tongue 260. As such, the press button 30b is prevented from upward release movement. The tongue 262 engages the lower end 37 of each rib 33. When the press button 30b is pressed, the respective resilient plate 311 is deformed and the press projection 342 is moved downward to contact the respective electric contact 24. As soon as the press button 30b is released from pressure, the resilient plate 311 is restored to its original shape, and therefore, the press button 30b is moved upwardly into its original position. The medium portion of each resilient plate 311 is generally S-shaped. As shown in FIG. 6, when the press button 30b is pressed to move in the direction of arrow B and is then released, the press button 30b can also be restored to its original position by the S-shaped medium portion.

Figure 7:
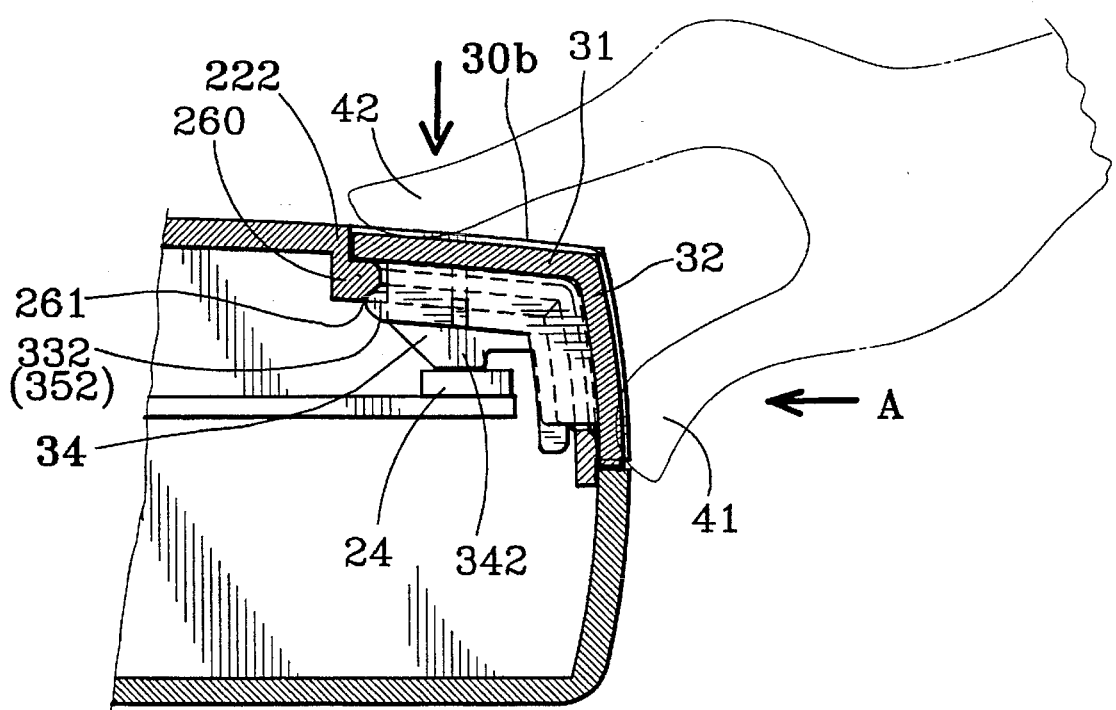
FIG. 7 is a schematic view showing the action of the trackball key when pressure is applied thereto.

In use, the user's hand may be put in a position as shown in FIG. 7. After one of the fingers 42 operates the pointing device 30a (as shown in FIG. 2), the thumb 41 can immediately press the front press plate 32 in the direction of arrow A. In this situation, the cam followers 332, 352 slide along the cam face 261, thus causing the press button 30b to move downwardly while moving rearwardly or inwardly. With the downward movement component, the press projection 342 can contact the electric contact 24 for electrical connection. The user can also use his fingers to press the top press plate 31 so that the press button 30b is directly moved downward. Therefore, the user can conveniently select pressing the top press plate 31 or the front press plate 32 for operating the trackball key, and the speed of selecting and inputting data can be increased.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A portable computer comprising:

a computer housing having a top wall and a front wall;

a pointing device mounted on said top wall adjacent to said front wall;

a concavity formed adjacent to said pointing device and open at said top wall and said front wall; and a press button mounted resiliently in said concavity, said press button having a top press plate exposed from said top wall and a front press plate extending forwardly and downwardly of said top press plate and exposed from said front wall, said press button being operated by exerting pressure on either said top press plate or said front press plate.

2. A portable computer as claimed in claim 1, further comprising a computer mainboard disposed in said computer housing below said top wall, and a trackball key electric contact mounted on said computer mainboard, said press button further having a press projection which extends downward from said top press plate to contact said trackball key electric contact when said press button moves downward, said press button moving resiliently downward while being pressed rearward.

3. A portable computer as claimed in claim 2, wherein said top press plate has a rear terminating end, and said front top press plate has a lower terminating end.

4. A portable computer as claimed in claim 3, wherein:

said top wall has a first cutout and said front wall has a second cutout connected to said first cutout, said concavity being formed by said first and second cutouts;

said top wall further having a first edge confining said first cutout, said first edge including a rear edge portion which has a first tongue extending downwardly and then forwardly from said rear edge to form a first shoulder for seating said rear terminating end when said press button is pressed;

said front wall having a second edge confining said second cutout, said second edge including a lower edge portion which has a second tongue extending upwardly to form a second shoulder for seating said lower terminating end when said press button is pressed.

5. A portable computer as claimed in claim 4, wherein:

said first tongue has a tongue end to extend below said rear terminating end of said top press plate, said tongue end being beveled to form a cam face which extends downwardly and rearwardly;

said press button further having a rib which extends along inner surfaces of said top press plate and said front press plate and which projects downward from said top press plate and rearward from said front press plate, said rib having a stepped rear rib end which has a cam follower face associated operatively said cam face, said cam face causing said press button to move downward while said press button is pressed rearward.

* * * * *